United States Patent
Rojas et al.

(10) Patent No.: US 10,209,399 B2
(45) Date of Patent: Feb. 19, 2019

(54) SYSTEM AND METHOD FOR CLOUD LOGGING SYSTEM

(71) Applicant: Halliburton Energy Services, Inc., Houston, TX (US)

(72) Inventors: Fabian Fidel Rojas, Houston, TX (US); Horacio Alberto Zea, Houston, TX (US); Manuel Felix Magdaniel, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 334 days.

(21) Appl. No.: 14/441,805

(22) PCT Filed: Nov. 14, 2012

(86) PCT No.: PCT/US2012/064999
§ 371 (c)(1),
(2) Date: May 8, 2015

(87) PCT Pub. No.: WO2014/077804
PCT Pub. Date: May 22, 2014

(65) Prior Publication Data
US 2015/0293259 A1 Oct. 15, 2015

(51) Int. Cl.
*G01V 99/00* (2009.01)
*E21B 47/00* (2012.01)
*H04L 29/08* (2006.01)
*E21B 44/00* (2006.01)
(Continued)

(52) U.S. Cl.
CPC .............. *G01V 99/00* (2013.01); *E21B 44/00* (2013.01); *E21B 47/00* (2013.01); *G01V 11/002* (2013.01); *G06F 17/30312* (2013.01); *H04L 67/12* (2013.01); *H04L 67/10* (2013.01)

(58) Field of Classification Search
None
See application file for complete search history.

(56) References Cited

U.S. PATENT DOCUMENTS 6,148,323 A * 11/2000 Whitner .................. G06F 11/28
714/E11.178
6,519,568 B1 2/2003 Harvey et al.
(Continued)

OTHER PUBLICATIONS

International Search Report and Written Opinion issued in related PCT Application No. PCT/US2012/064999 dated Jul. 30, 2013, 10 pages.

(Continued)

*Primary Examiner* — Michael Lebentritt
(74) *Attorney, Agent, or Firm* — Alan Bryson; Baker Botts, L.L.P.

(57) ABSTRACT

A method for implementing a wireline logging cloud computing system includes transforming the single computing device in use at well-sites to perform tool processing into a cloud configuration that can use multiple computing devices. The method includes using a logging manager user interface to communicate tool processing requests and using a logging manager service provider to create a cloud configuration for the tool processing. The method further may include implementing a post-processing manager for implementing cloud computing for post-processing tasks.

19 Claims, 6 Drawing Sheets

(51) Int. Cl.
*G01V 11/00* (2006.01)
*G06F 17/30* (2006.01)

(56) References Cited

U.S. PATENT DOCUMENTS

| | | | | |
|---|---|---|---|---|
| 8,615,660 | B1* | 12/2013 | Selman | H04L 67/125 340/853.2 |
| 2005/0132246 | A1* | 6/2005 | Schmalz | H04J 3/0667 713/502 |
| 2005/0240351 | A1 | 10/2005 | Kevin | |
| 2006/0117091 | A1* | 6/2006 | Justin | G06F 11/3476 709/217 |
| 2008/0071899 | A1* | 3/2008 | Odaka | H04L 41/06 709/223 |
| 2008/0173480 | A1* | 7/2008 | Annaiyappa | E21B 15/00 175/24 |
| 2009/0166031 | A1* | 7/2009 | Hernandez | E21B 21/08 166/250.01 |
| 2010/0057364 | A1 | 3/2010 | Clavand | |
| 2010/0125664 | A1* | 5/2010 | Hadar | G06F 9/5072 709/224 |
| 2010/0132450 | A1* | 6/2010 | Pomerantz | G01N 33/2823 73/152.28 |
| 2010/0147510 | A1* | 6/2010 | Kwok | G01V 11/00 166/250.01 |
| 2010/0259415 | A1* | 10/2010 | Strachan | E21B 44/00 340/853.6 |
| 2010/0295673 | A1 | 11/2010 | Ahmad | |
| 2010/0306377 | A1 | 12/2010 | Dehann et al. | |
| 2010/0332262 | A1 | 12/2010 | Horvitz et al. | |
| 2011/0264372 | A1 | 10/2011 | Ma et al. | |
| 2011/0272144 | A1 | 11/2011 | Belchert et al. | |
| 2011/0307523 | A1 | 12/2011 | Balani et al. | |
| 2012/0160011 | A1 | 6/2012 | Whittaker et al. | |
| 2012/0324116 | A1* | 12/2012 | Dorai | G06F 9/5072 709/226 |
| 2014/0041865 | A1* | 2/2014 | Paulk | E21B 44/00 166/250.01 |
| 2014/0052290 | A1* | 2/2014 | Dirksen | E21B 47/00 700/175 |
| 2014/0083688 | A1* | 3/2014 | Rojas | E21B 44/00 166/250.01 |
| 2017/0054728 | A1* | 2/2017 | Hadar | G06F 9/5072 |

OTHER PUBLICATIONS

International Preliminary Report on Patentability issued in related PCT Application No. PCT/US2012/064999, dated May 28, 2015 (7 pages).
Feblowitz, Jill "Oil and Gas: Into the Cloud?", Journal of Petroleum Technology, vol. 63, Issue 5, May 1, 2011, pp. 32-33, XP055271008 (https://www.onepetro.org/download/journal-paper/SPE-0511-0032-JPT?id=journal-paper/SPE-0511-0032-JPT (2 pages).
Search Report issued in related European Application No. 12788705.7, dated May 31, 2016 (8 pages).
Office Action issued in related Canadian Application No. 2,889,150, dated Jul. 5, 2016 (6 pages).

* cited by examiner

SYSTEM AND METHOD FOR CLOUD LOGGING SYSTEM

CROSS-REFERENCE TO RELATED APPLICATION

The present application is a U.S. National Stage Application of International Application No. PCT/US2012/064999 filed Nov. 14, 2012, which is incorporated herein by reference in its entirety for all purposes.

BACKGROUND

The present invention relates to wireline operations, and more particularly, to a system and method for a cloud logging system for wireline logging data acquisition and tool processing.

Hydrocarbons, such as oil and gas, are commonly obtained from subterranean formations. Although systems for wireline logging data acquisition and tool processing are known, these systems may not be able to handle more complex tool processing. Generally, systems for wireline logging data acquisition and tool processing include a single computing device at a well-site. These systems depend on the installed computer hardware available at the well-site to perform the logging data and tool processing.

Typically, subterranean operations involve a number of different steps such as, for example, drilling the wellbore at a desired well site, treating the wellbore to optimize production of hydrocarbons, and performing the necessary steps to produce and process the hydrocarbons from the subterranean formation.

Each of these different steps involve a plurality of tool processing and logging data acquisition provided by one or more information provider units, which provide measurements and data relating to the operation of the well-site. These measurements may include surface measurements and data may further comprise downhole telemetry data. The information provider units may include units such as the wireline drum, the managed pressure drilling unit (MPD), underbalanced pressure drilling unit, fluid skid, measurement while drilling (MWD) toolbox, and other such systems. Generally, for operation of a wellsite, it is required that parameters be measured from each of the information provider units at a wellsite.

Traditionally, logging data acquisition and tool processing are being performed by the computing device installed at the well-site. The range of processing computer power required to perform the various tool processing can range from the very simple to more complex and computing intensive processing tasks. However, because the tool processing is performed by the computing device available at the well-site, each well-site must have the capability to perform the most complex tool processing requiring the most sophisticated hardware available for the computing device. Additionally, as tool processing generates more complex and time consuming results, the hardware at these well-sites must be updated in each logging unit that performs logging data acquisition and tool processing. Such upgrades can be very costly to the management of a well-site.

Alternatively, another solution that has been previously proposed to address the problem of more complex tool processing is to perform simple functions at the well-site and reprocess the data later in a remote computer center. Such a system also has drawbacks in that the system only provides for minimal processing at the well-site location. This may slow down efforts at the well-site resulting in significant expense by delay of operation at the well-site. This solution also fails to offer a real-time solution to the problem of complex tool processing emerging in the field.

Another alternative would be to employ multiple computers, one to acquire and gather tool processing data, and another to reprocess data as it arrives. However, the limitation with this solution is that it will raise the expense of having multiple devices at each well-site dedicated to this task. With space being at a premium at a well-site, this solution also has limitations.

These processes of collecting the data from the various information provider units and tool processing can be time-consuming, cumbersome, and inefficient. With the increasing demand for hydrocarbons and the desire to minimize the costs associated with performing rig operations, there exists a need for a cloud logging system to handle simple to complex logging data acquisition and tool processing. The cloud logging system also eliminates the need for the end user to have knowledge of the physical location and configuration of the computing devices and the increases needed in computing capacity.

SUMMARY OF THE INVENTION

The present invention relates to wireline operations, and more particularly, to a system and method for a cloud logging system for wireline logging data acquisition and tool processing.

In one exemplary embodiment, the present invention is directed to a cloud logging system comprising: a wireline logging cloud computing system, wherein the wireline logging cloud computing system includes one or more computing devices, wherein the one or more computing devices are allocated based on a determination of a processing requirement for a tool processing; a database, wherein the database is operable to receive one or more measurements from a well-site; a logging manager, wherein the logging manager manages the determination of the processing requirement for tool processing; and a graphical user interface.

In another exemplary embodiment, the present invention is directed to a method of creating a cloud configuration for tool processing comprising the steps of: allocating one or more computing devices based on a determination of a processing requirement for tool processing; receiving one or more measurements from a well-site at a database, wherein the database is operably connected to the one more computing devices; managing the determination of the processing requirement for tool processing, wherein the managing is performed by a logging manager; and interacting with the cloud configuration through a graphical user interface.

The features and advantages of the present invention will be apparent to those skilled in the art from the description of the preferred embodiments which follows when taken in conjunction with the accompanying drawings. While numerous changes may be made by those skilled in the art, such changes are within the spirit of the invention.

BRIEF DESCRIPTION OF THE DRAWINGS

Some specific example embodiments of the disclosure may be understood by referring, in part, to the following description and the accompanying drawings.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wireless or wired connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present application is directed to a cloud logging system for wireline logging data acquisition and tool processing. The cloud logging system can provide for distribution and sharing of computing processing and resources, and the ability to add 1, 2, . . . , n computing devices without user interfaces. For a particular user/tool string, the cloud logging system can create a cloud configuration considering tool processing requirements. The cloud configuration can be used to distribute the tool processing across multiple computing devices. The cloud logging system can include a Logging Manager User Interface that can run anywhere and display tool specific user interfaces and controls, and a Logging Manager Service Provider that creates a cloud configuration for a specific tool string that will have in consideration the number of computing devices and tool processing computing requirements.

In certain embodiments according to the present disclosure, a cloud logging system may relieve the end user from having knowledge of the physical location and configuration of the computing devices and the management of the allocation of computing devices can be done automatically based on the service to be performed.

Several drivers exist for creating a cloud logging system for wireline data acquisition and tool processing. Current logging systems depend on the installed computer hardware. Tool processing are demanding more complex and time consuming operations. This requires the upgrade of computer hardware at every site. Further, the cost of having the most sophisticated hardware available in every logging unit to handle the certain complex tool processing that would occur for each logging unit is significantly expensive. The cloud logging system results in the efficient management of the allocation of computing devices by performing the allocation on the fly based on, for example, the service to be performed by the logging unit. This will permit delivering answer products in real-time allowing decisions to be made in a timely manner based on the resulting calculations. By reducing the need to upgrade hardware at every logging unit and sharing computing devices, this will reduce the cost of operation of the well-site. Further, data management can be centralized giving opportunity to improve in data storage, backup, organization, distribution, and security. Software can also be centralized to improve versioning and customization per client requirements.

With reference to the attached figures, certain embodiments of the present invention include a system 100 that may include a network 200 that couples together at least one wellsite 104A-104N the wellsites 104A-104N may include a wireline acquisition unit 210A-210N that may store the surface measurements and down hole data. Additionally, the wireline acquisition unit 210 may perform known functions such as power control, real time control loops, and other tasks routinely performed in connection with logging systems. The wireline acquisition unit 210 may also function as a backup storage in real-time and assist in performing real-time operations. The wireline acquisition unit 210, for example, may receive wellsite data from various surface measurements 140, including, for example, depth, time, and other measurements known to persons of ordinary skill in the art. The wireline acquisition unit 210, for example, may also receive wellsite data from various downhole telemetry measurements 150, including, for example, tool data, time, and other measurements known to persons of ordinary skill in the art, as further described below. Network 200 may be coupled to multiple communication networks working in conjunction with multiple servers. As further illustrated in FIG. 1, the wellsite data may be acquired through the downhole tool string 105 through the wireline 110 across to the wireline system 120.

For purposes of this disclosure, a wireline acquisition unit may include an information handling system which may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

In an illustrative embodiment, the wireline acquisition unit may receive the wellsite data to store the data in one or more non volatile machine-readable media (not shown). In addition, the wireline acquisition unit may transmit data via network 200 and radio frequency transceivers (not shown) to remote locations. In some embodiments, the non-volatile machine readable media (not shown) may be representative of servers for storing the wellsite data therein.

The network communication may be any combination of wired and wireless communication. In one example, at least a portion of the communication is transferred across the internet using TCP/IP internet protocol. In some embodiments, the network communication may be based on one or more communication protocols (e.g., HyperText Transfer Protocol (HTTP), HTTP Secured (HTTPS), Application Data Interface (ADI), Well Information Transfer Standard Markup Language (WITSML), etc.). A particular non-volatile machine-readable medium may store data from one or more wellsites and may be stored and retrieved based on various communication protocols. The non-volatile machine-readable media may include disparate data sources (such as ADI, Javi Application Data Interface (JADI), Well Information Transfer Standard Markup Language (WITSML), Log ASCII Standard (LAS), Log Information Standard (LIS), Digital Log Interchange Standard (DLIS), Well Information Transfer Standard (WITS), American Standard Code for Information Interchange (ASCII), OpenWorks, SiesWorks, Petrel, Engineers Data Model (EDM), Real Time Data (RTD), Profibus, Modbus, OLE Process Control (OPC), various RF wireless communication protocols (such as Code Division Multiple Access (CDMA), Global System for Mobile Communications (GSM), etc.), Video/Audio, chat, etc.). While the system 100 shown in FIG. 1 employs a client-server architecture, embodiments are not limited to such an architecture, and could equally well find application in a distributed, or peer-to-peer, architecture system.

Figure 1:
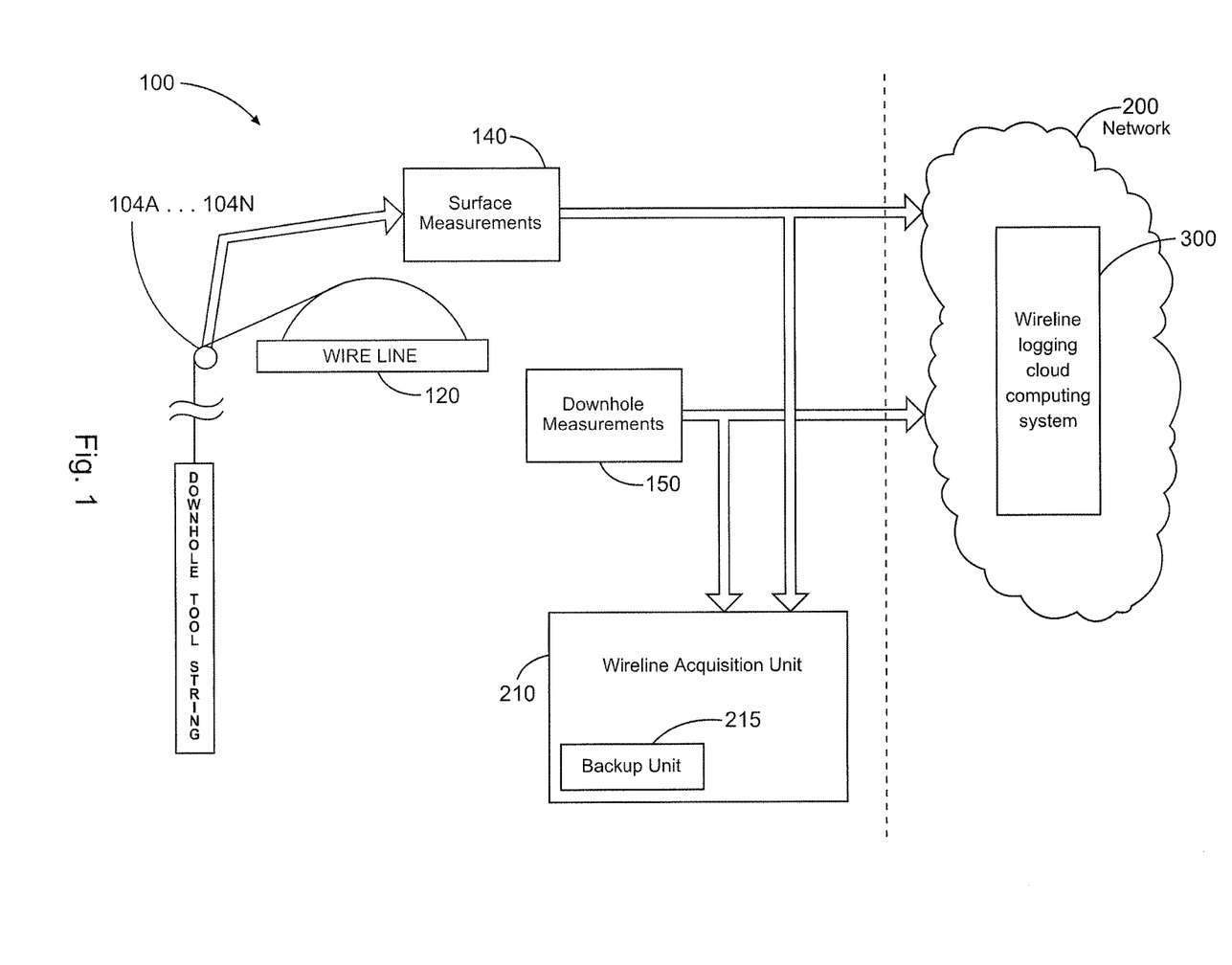
FIG. 1 is a illustrative wellsite system of the invention.
Figure 2:
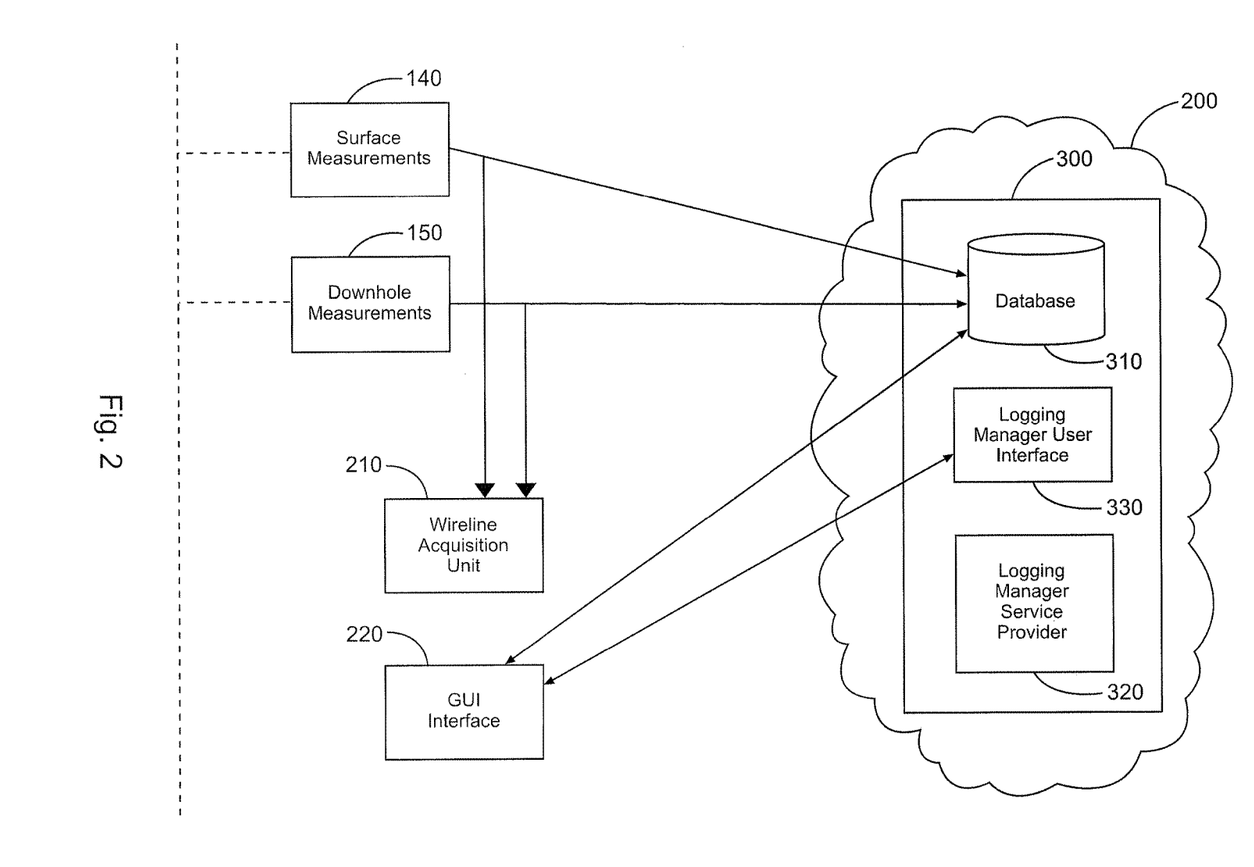
FIG. 2 shows an illustrative improved cloud logging system in accordance with an exemplary embodiment of the present invention.

FIG. 1 illustrates that the surface measurements 140 may further be received through the Network 200 to the wireline logging cloud computing system 300, as further illustrated in FIG. 2. Additionally, downhole measurements 150 may also further be received through the Network 200 to the wireline logging cloud computing system 300, as further illustrated in FIG. 2. Additionally, surface measurements and downhole measurements may further be communicatively coupled to the wireline acquisition unit 210. The wireline acquisition unit may also contain a realtime storage backup unit 215 that stores the surface measurements 140 and downhole measurements 150.

The wireline acquisition unit 210 may be an information handling system that may be used for acquiring wellsite data, according to some embodiments. The wireline acquisition unit 210 may include a memory unit, processor bus, and an input/output controller hub (ICH). The processor(s), memory unit, and ICH may be coupled to the processor bus. The processor(s) may include any suitable processor architecture. The wireline acquisition unit 210 may include one or more processors, any of which may execute a set of instructions in accordance with embodiments of the invention.

The memory unit may store data and/or instructions, and may include any suitable memory, such as a dynamic random access memory (DRAM). Wireline acquisition unit 210 may also include hard drives such as IDE/ATA drive(s) and/or other suitable computer readable media storage and retrieval devices. A graphics controller may control the display of information on a display device, according to certain embodiments of the invention.

The surface measurements 140 and downhole measurements 150 may be communicatively coupled to the wireline acquisition unit 210. For some embodiments of the invention, the wireline acquisition unit 210 may provide an interface to one or more suitable integrated drive electronics drives, such as a hard disk drive (HDD) or compact disc read only memory (CD ROM) drive, or to suitable universal serial bus (USB) devices through one or more USB ports. In certain embodiments, the wireline acquisition unit 210 may also provide an interface to a keyboard, a mouse, a CD-ROM drive, and/or one or more suitable devices through one or more firewire ports. For certain embodiments of the invention, the wireline acquisition unit 210 may also provide a network interface through which the wireline acquisition unit 210 can communicate with other computers and/or devices.

In certain embodiments, the connection may be an Ethernet connection via an Ethernet cord. As would be appreciated by those of ordinary skill in the art, with the benefit of this disclosure, the wireline acquisition unit 210 may be communicatively coupled to receive the surface measurements 140 and downhole measurements 150 by other suitable connections, such as, for example, wireless, radio, microwave, or satellite communications. Such connections are well known to those of ordinary skill in the art and will therefore not be discussed in detail herein. The data may be stored in a database with a common architecture, such as, for example, oracle, SQL, or other type of common architecture.

The surface measurements 140 and downhole measurements 150 may be generated by digital data electrical signals representative of the measurements obtained for the respective SDL (Surface Data Logging) operations. One skilled in the art will understand that any number of sensors that generate such digital data electrical signals representative of the measurements may be used without departing from the scope of the present invention. For example, and not as a limitation, sensors may be selected to measure any number of downhole parameters, including, but not limited to, environmental parameters, directional drilling parameters, and formation evaluation parameters. Such parameters may include downhole pressure, downhole temperature, the resistivity or conductivity of the drilling mud and earth formations, the density and porosity of the earth formations, as well as the orientation of the wellbore. Sensor examples include, but are not limited to: a resistivity sensor, a nuclear porosity sensor, a nuclear density sensor, a magnetic resonance sensor, and a directional sensor package. Additionally, formation fluid samples and/or core samples may be extracted from the formation using formation tester. Such sensors and tools are known to those skilled in the art. In an embodiment, the sensors may be based on a standard hardware interface that could add new sensors for measuring new metrics at the rigsite in the system.

In one example, downhole measurements 150 may be generated by telemetry signals for transmitting data from downhole to the surface. These include, but are not limited to, electromagnetic waves through the earth and acoustic signals using the drill string as a transmission medium. In yet another alternative, drill string may include wired pipe enabling electric and/or optical signals to be transmitted between downhole and the surface.

In addition, various surface parameters may also be measured. Such surface measurements 140 may include rotary torque, rotary RPM, well depth, hook load, standpipe pressure, and any other suitable parameter of interest.

In one embodiment of the wireline acquisition unit 210, data acquisition occurs in real-time. The data is pushed at or near real-time enabling real-time communication, monitoring, and reporting capability. This allows the collected data to be used in a streamline workflow in a real-time manner by other systems and operators concurrently with acquisition.

As shown in FIG. 2, the surface measurements 140 and downhole measurements 150 may also be communicatively coupled to a cloud computing system, illustrated as a wireline logging cloud computing system 300. The wireline logging cloud computing system 300 may include a database 310 which may, for example, may receive and store the data including the surface measurements 140 and the downhole measurements 150. As would be appreciated by those of ordinary skill in the art, with the benefit of this disclosure, the database 310 may include a computer-readable media.

As further illustrated in FIG. 2, the cloud computing system 300 may further include a logging manager user interface 330 and a logging manager service provider 320.

In one embodiment, the database 310 may also be communicatively coupled to a software for performing, for example, the collection and reporting functions. In one exemplary embodiment, the software may offer visualization through a graphical user interface 220. The graphical user interface 220 may further be communicatively coupled to the logging manager user interface 330, which may be implemented in software. In one exemplary embodiment, the graphical user interface 220 may interact with the logging manager user interface to allow a user of the system to access services controlled by permissions from the logging manager service provider 320. The logging manager user interface 330, in one embodiment as software, can be run at the well-site or can be connected remotely and run from a remote operation center. The logging manager user interface 330 may further display tool specific user interfaces and controls. The logging manager user interface 330 may further display the current status of the logging manager service provider 320.

The database 310 may collect data from surface measurements 140 and downhole measurements 150, which may include information regarding surface sources, rig, motors, pumps, tanks (stress, torque, load, flow, temperature, levels, speed, current, voltage, power, audio/video, worker location/position, inventory, RFID, etc.). The data could be stored in a hardened environment or remotely for data integrity. This would allow the system to function like the black box on an aircraft recording data up to and potentially after time of failure.

Figure 3:
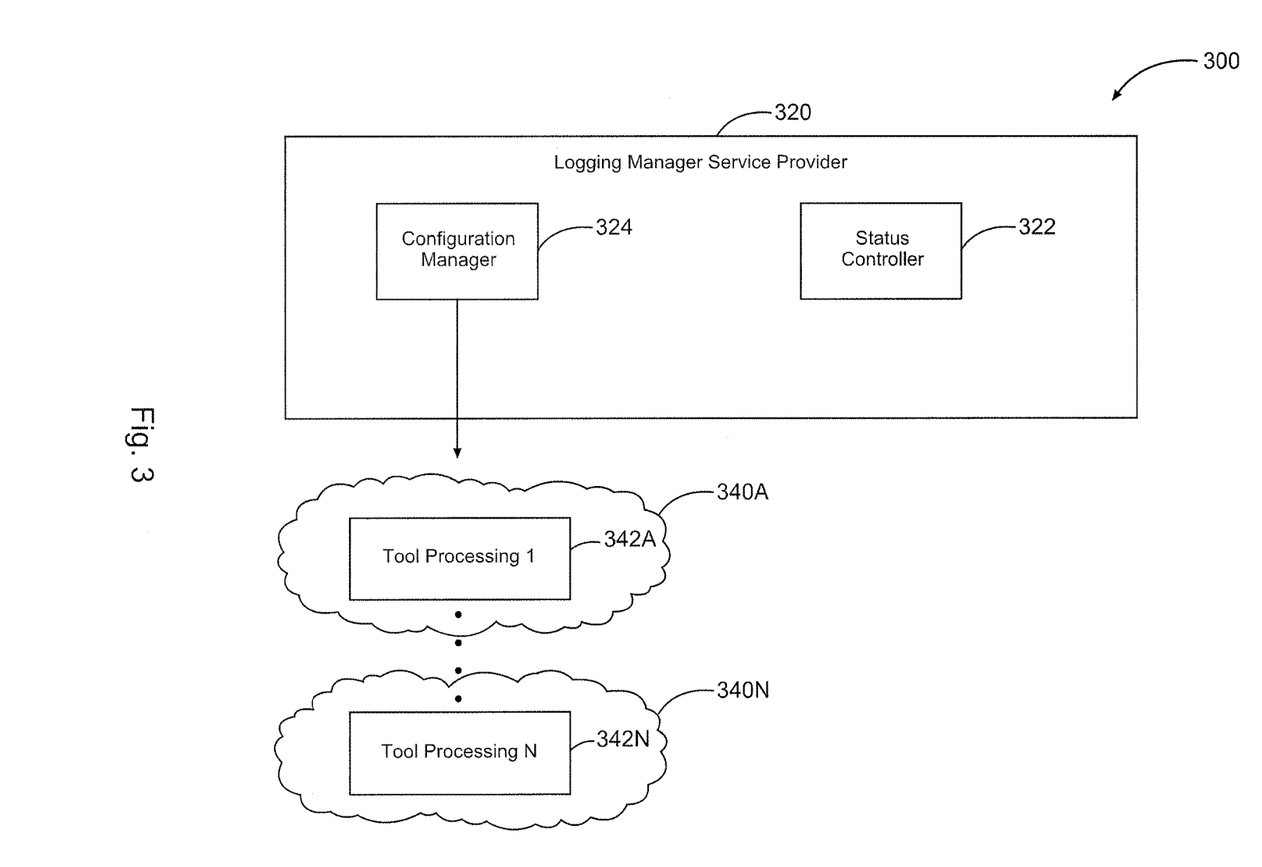
FIG. 3 shows additional details of a cloud logging system in accordance with an exemplary embodiment of the present invention.

FIG. 3 further illustrates an embodiment of the logging manager service provider 320 of the cloud computing system 300. The logging manager service provider 320 may further comprise a status controller 322. In an example embodiment, the status controller 322 is not connected to a graphical user interface. With the status controller not having a graphical user interface, the need for the end user to have knowledge of the physical location and configuration of the computing devices is eliminated. The status controller 322 has knowledge of the available computing devices available and communicatively coupled to the cloud computing system 300 for use in tool processing for the well-site.

As shown in the exemplary embodiment of FIG. 3, the logging manager service provider 320 may further comprise a configuration manager 324. The configuration manager contains logic that is communicatively coupled to the various computing devices for the cloud computing system 300.

When a user of the system accesses a logging service through the logging manager user interface 330, or by other readily available systems, the logging manager service provider 320 may, in an embodiment, use the configuration manager 324 to create a cloud configuration for the tool processing 342A . . . 342N. The cloud configuration 340 will be based, at least in part, on the consideration of the number of computing devices required to perform the tool processing computer requirements. A tool processing based on the selection of a logging service may involve identifying a set of tools with available sensors to measure and record data that pertain to the type of logging service requested by a user. These tools would constitute a tool string. The tool string may then be placed downhole to perform the requested measurements that will for the basis for the logging service requested by the user. Additionally, tool processing may involve loading the appropriate processing and calibration using software and preparing the computing devices to process the data that comes from downhole from the tool string.

For complex and time consuming tool processing, multiple computing devices may be required to perform the tool processing and the configuration manager 324 will create a cloud configuration 340A with a number of computing devices ranging from 1 . . . N to accomplish the requested tool processing 342A. For simple tool processing tasks, the configuration manager 324 may assign a fewer number of computing devices for the cloud configuration 340A ranging from 1 . . . N to accomplish the requested tool processing. The configuration manager 324 will function to create a cloud configuration 340N for each set of tool processing 342N tasks desired by the user of the system. Alternatively, a user of the system may set automatic tool processing which could occur based on time or based on collection of various parameters. Each of these types of tool processing are known and included within the spirit and scope of the invention.

Figure 4:
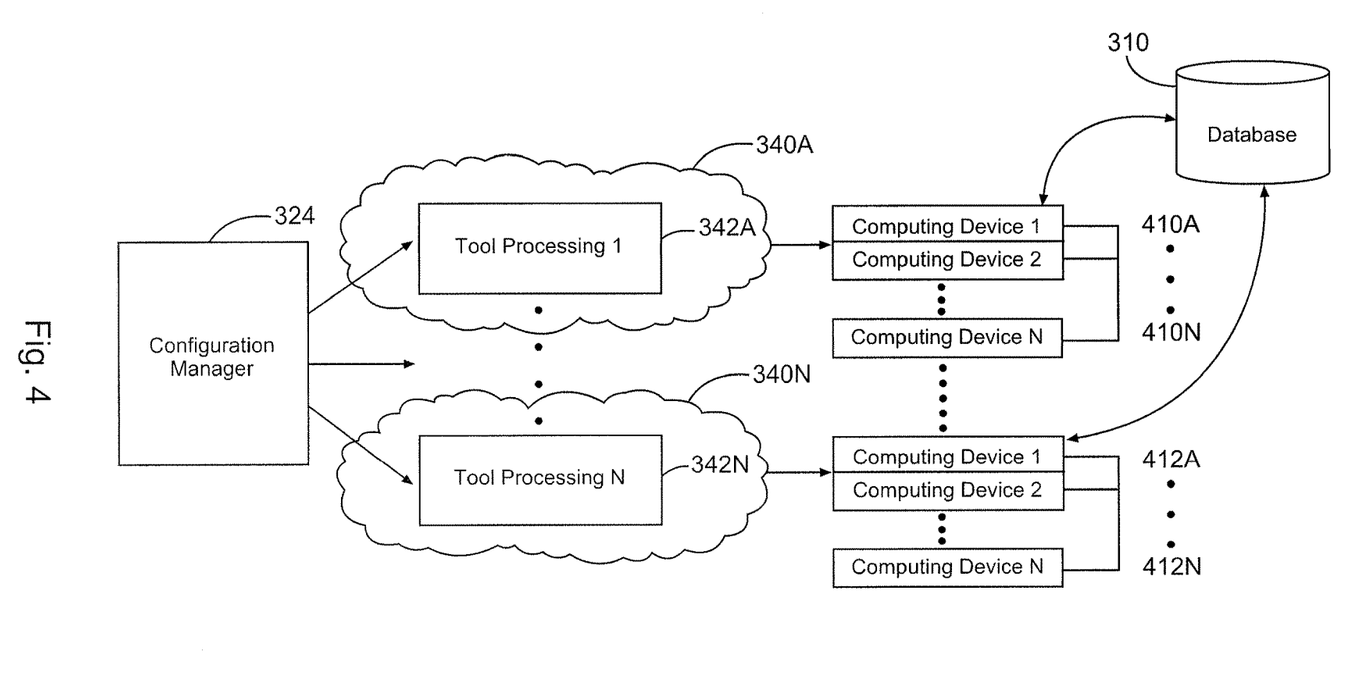
FIG. 4 shows an illustrative of the configuration aspect of the cloud logging in accordance with an exemplary embodiment of the present invention.

In an exemplary embodiment, as shown in FIG. 4, the logging manager service provider 320 is requested by a user of the system through the logging manager user interface 330 to perform tool processing 1 342A. The status controller 322 determines the available computing devices 410 for the task. The configuration manager 324 identifies the amount of computing device capability required to perform the tool processing. The configuration manager 324 may then create a cloud configuration 340A for the tool processing 342A to accomplish the requested tool processing 342A. The cloud configuration 340A may include a set of computing devices 410A . . . 410N illustrated in FIG. 4 that form the cloud configuration to perform the requested tool processing. The tool processing will then be distributed across the multiple computing devices. Each tool processing can pace according to its own needs as known to one of ordinary skill in the art. Further, the configuration manager 324 may perform this task for any set of tool processing 342A . . . 342N requests. The computing devices 410A . . . 410N, 412A . . . 412N, and so forth, for each cloud configuration 340A . . . 340N are communicatively coupled to the database 310 to have access to the specific downhole measurements 140 and surface measurements 150 to generate results. In one embodiment, the tool processing produces data that may be presented to the operation personnel in a variety of visual display presentations such as a display. The results may be further stored in the database 310.

Once the particular task for the tool processing 342A . . . 342N has been completed and the results generated, the computing devices 410A . . . 410N, 412A . . . 412N, and so forth, may be available to perform other tasks. Additionally, as is known to one of ordinary skill in the art, distributed computing across multiple computing devices does not indicate a one-to-one correlation between the computing device and the task. As such, it is understood that a particular computing device may comprise one or more computers, and that a computing device may be used to perform multiple tool processing at the same time. Further, a computing device may be a part of multiple cloud configurations at the same time.

The computing devices may be present at the well-site for use in a cloud configuration. In one embodiment, the wireline logging cloud computing system 300 may be implemented within the wireline acquisition unit 210. In such an embodiment, there may be a computing device connected to the database 310 and operably connected to various other computing devices at the well-site such that the computing devices may be used in a cloud configuration. In other embodiments, the wireline logging cloud computing system 300 may be implemented at a remote operations center. A computing device may be connected to the database 310 and then operably connected to various other computing devices at a remote location such that the computing devices may be used in a cloud configuration. Further embodiments included within this invention include operably connecting multiple well-sites through computing devices capable of operating in a cloud configuration environment such that multiple well-sites may share computing resources in a cloud configuration.

The cloud computing system 300 allows for configuration of computing devices and addresses any need of increasing computing capacity on the fly. Computing power can be farmed and resources can be shared between tool processing tasks as well as logging systems. Data management is also centralized for the various surface measurements 140 and downhole measurements 150. The cost of operation of the well-site may be further reduced by allowing for decisions based on results generated from the cloud computing systems.

Figure 5:
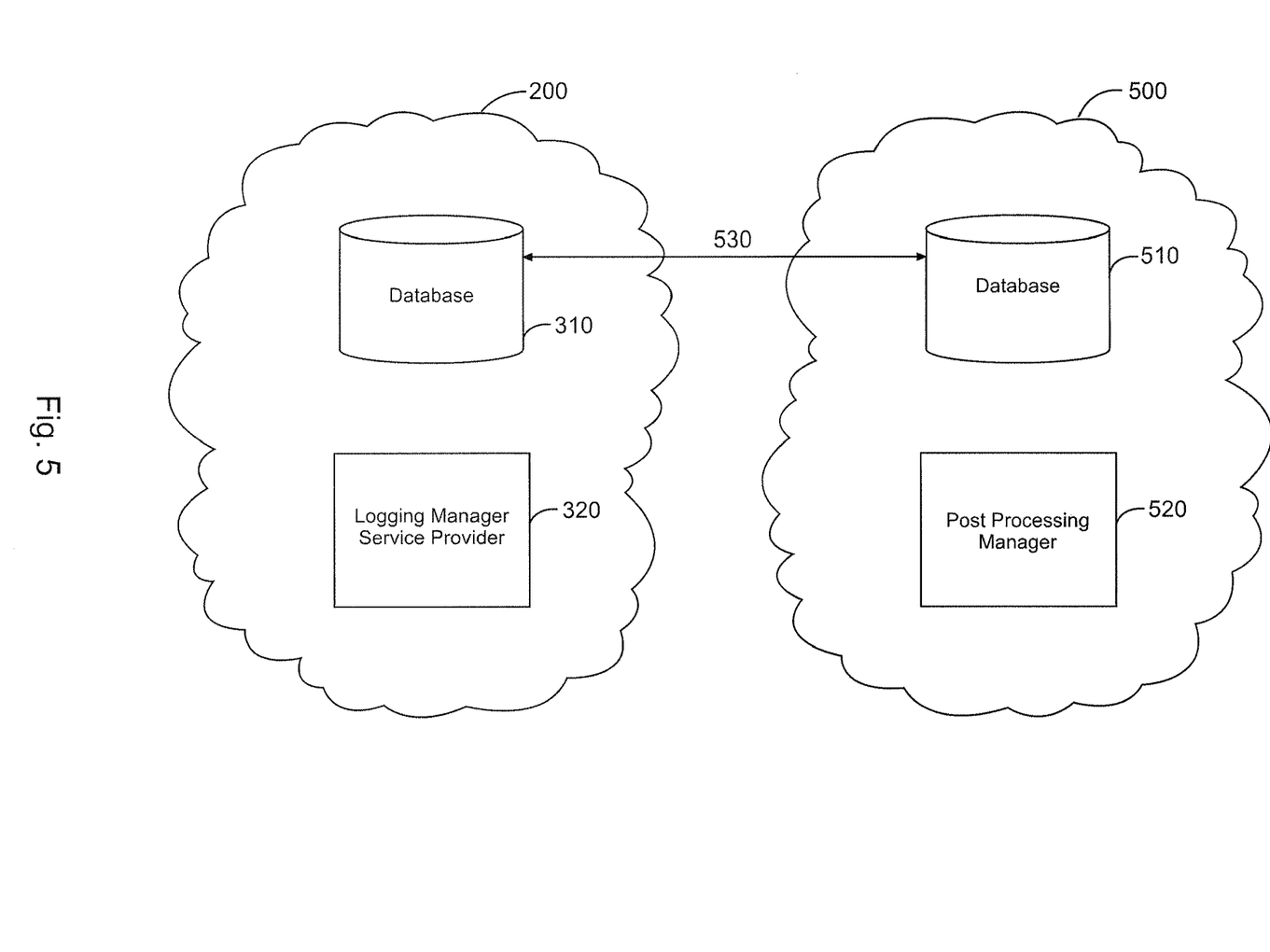
FIG. 5 shows another illustrative of the cloud logging system in accord with an exemplary embodiment of the present invention.

As shown in FIG. 5, the cloud computing system may also be communicatively coupled to a post processing manager 520. The post processing manager 520 may also be communicatively coupled to another database 510. Each of the post processing manager 520 and the database 510 may be communicatively coupled within a network 500. In an embodiment, the network 500 can be within or a part of the network 200. Further, in an embodiment, the post processing manager 520 and the database 510 may be communicatively coupled through an external communications interface. The external communications interface permits the data from the database 310 to be remotely accessible by any remote information handling system communicatively coupled to the remote connection via, for example, a satellite, a modem or wireless connections. In one embodiment, the external communications interface may include a router. The post processing manager 520 may perform tasks including expert tasks, data delivery tasks, batch tasks, and related tasks. In one embodiment, the post processing manager 520 is a software that accomplishes these tasks for a cloud computing system. The database 310 and the database 510 are communicatively coupled 530 to exchange surface measurements 140, downhole measurements 150, or processed data and results from tool processing as described above. The post processing manager 520 may function as a logging manager service provider for post-processing tasks.

After performing the logging services requested by a user, there may remain several post-processing tasks that need to be performed at the well-site. These tasks may also be computationally intensive and require the presence of the operator through the performance of the task. By use of a post-processing manager 520, these tasks can be performed by multiple computing devices using a cloud configuration in the same manner as the tool processing by the logging manager service provider through the implementation of this invention.

Figure 6:
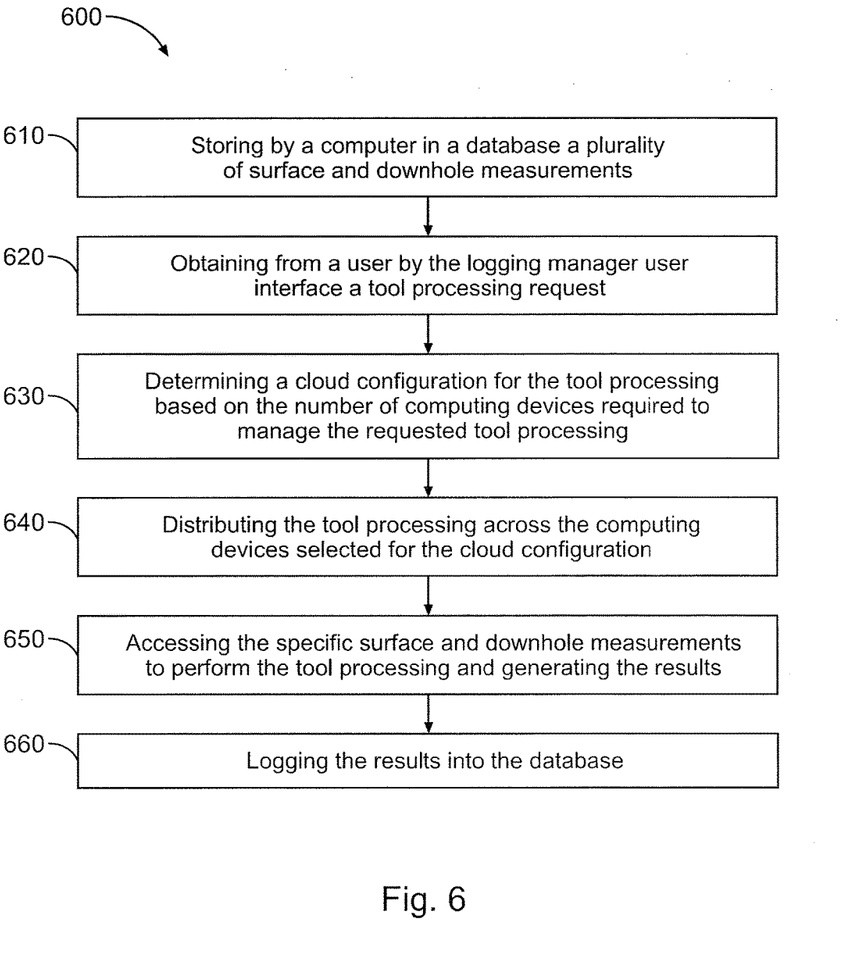
FIG. 6 illustrates a flowchart for creating a cloud configuration in accord with an exemplary embodiment of the present invention.

FIG. 6 depicts a flow chart illustrating an exemplary embodiment of the present invention. Embodiments of the present invention can include a computer-implemented method to create a cloud configuration for tool processing 600. The computer-implemented method 600 can include, for example, storing by a computer in a database in tangible and non-transitory computer memory a plurality of requirements for tool processing for a plurality of well-logging tools. The computer-implemented method 600 can include, for example, storing in a database a plurality of surface measurements and downhole measurements 610 accessible by a cloud computing system. The computer-implemented method 600 can include, for example, obtaining from a user by the logging manager user interface 620 a requested tool processing. The user may input the desired tool processing logging service by a graphical user interface. The computer-implemented method 600 can include, for example, determining a cloud configuration for the tool processing based on the number of computing devices 630 required to manage the requested tool processing. The step of determining a cloud configuration for the tool processing may also be based on the type of logging service required, the algorithm involved with the tool processing, the availability of computing devices, the difficulty or ease of the task to be performed, and the current status of the resources for the cloud computing system. Additionally, the step of determining a cloud configuration 630 may further involve distributing the tool processing across the computing devices selected for the cloud configuration 640. The computer-implemented method 600 can include, for example, accessing the specific downhole measurements and surface measurements to perform the tool processing, and further generating the results of the tool processing 650. The computer-implemented method 600 can include, for example, logging the results in the database 660.

As an example of tool processing that is computationally intensive, a well-site may acquire and track information by producing an image from the data provided by way of telemetry data. This image may be, as an example, a three-dimensional image of the well-bore including the depth and formation of the well-bore. The tool processing required to generate the results for this type of computation would require intensive computing analysis. This is just an example of a type of tool processing that could benefit from the present invention. Other computationally intensive tool processing is known to persons of ordinary skill in the art.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A system for cloud computing for a well-site, comprising:
   a wireline logging cloud computing system, wherein the wireline logging cloud computing system includes a logging manager user interface and a logging manager service provider;
   further wherein the logging manager user interface is communicatively coupled to a graphical user interface;
   at least one memory;
   a database in the at least one memory; wherein the database is communicatively coupled to the wireline logging cloud computing system;
   further wherein the database is operable to receive one or more well-site measurements from one or more information provider units, wherein the one or more information provider units are located at one or more well-sites;
   at least one processor executing the steps comprising:
      receiving from a user a request to perform a tool processing;
      allocating by the logging manager service provider one or more computing devices communicatively coupled to the wireline logging cloud computing system, wherein the allocating is based on a determination of a processing requirement for the tool processing;
      using the allocated one or more computing devices to perform the tool processing to generate a result, wherein at least one of the one or more computing devices is located remote from the well-site for which the user request is being performed;
   a post-processing manager communicatively coupled to a second database.

2. The system of claim 1, wherein the one or more measurements comprise a surface measurement.

3. The system of claim 1, wherein the one or more measurements comprise a downhole measurement.

4. The system of claim 1, further wherein the results are stored in the database.

5. The system of claim 1, further wherein the post-processing manager uses results of the tool processing to perform a post-processing task.

6. The system of claim 1, wherein the computing devices are located at a remote network operations center.

7. A method for cloud computing for a well-site, comprising:
   receiving a user request to perform a tool processing, wherein the user request is received by a logging manager user interface of a wireline logging cloud computing system, further wherein the logging manager user interface is communicatively coupled to a graphical user interface;
   allocating by a logging manager service provider one or more computing devices communicatively coupled to the wireline logging cloud computing system, wherein the allocating is based on a determination of a processing requirement for the tool processing;
   retrieving a measurement from a database in at least one memory, wherein the database is operable to receive one or more well-site measurements from one or more information provider units, wherein the one or more information provider units are located at one or more well-sites;
   using the allocated one or more computing devices and the one or more well-site measurements to perform the tool processing to generate a result, wherein at least one of the one or more computing devices is located remote from the well-site for which the user request is being performed;
   performing a post-processing task by a post-processing manager communicatively coupled to a second database.

8. The method of claim 7, wherein the one or more measurements comprise a surface measurement.

9. The method of claim 7, wherein the one or more measurements comprise a downhole measurement.

10. The method of claim 7, further wherein the results are stored in the database.

11. The method of claim 7, further wherein the post-processing manager uses results of the tool processing to perform a post-processing task.

12. The method of claim 7, wherein the computing devices are located at a remote network operations center.

13. A computer-implemented method for logging wireline data using a wireline logging cloud computing system, comprising:
   a logging manager user interface;
   a logging manager service provider;
   wherein the logging manager user interface is communicatively coupled to the logging manager service provider;
   further wherein the logging manager user interface is communicatively coupled to a graphical user interface;
   at least one memory;
   a database in the at least one memory; wherein the database is communicatively coupled to the wireline logging cloud computing system;

further wherein the database is operable to receive one or more well-site measurements from one or more information provider units; wherein the one or more information provider units are located at one or more well-sites;

at least one processor executing the steps comprising:

receiving from a user a request to perform a tool processing;

allocating by the logging manager service provider one or more computing devices communicatively coupled to the wireline logging cloud computing system, wherein the allocating is based on a determination of a processing requirement for the tool processing;

using the allocated one or more computing devices to perform the tool processing to generate a result; wherein at least one of the one or more computing devices is located remote from the well-site for which the user request is being performed;

a post-processing manager communicatively coupled to a second database.

14. The system of claim 13, wherein the one or more measurements comprise a surface measurement.

15. The system of claim 13, wherein the one or more measurements comprise a downhole measurement.

16. The system of claim 13, further wherein the results are stored in the database.

17. The system of claim 13, further wherein the post-processing manager uses results of the tool processing to perform a post-processing task.

18. The system of claim 13, wherein the computing devices are located at a remote network operations center.

19. The system of claim 13, further wherein the second database is communicatively coupled to the database.

* * * * *